(12) United States Patent
Heinrich

(10) Patent No.: US 10,619,515 B2
(45) Date of Patent: Apr. 14, 2020

(54) COMPONENT CONSTRUCTION, COMPONENT FOR A GAS TURBINE AND METHOD FOR MANUFACTURING A COMPONENT OF GAS TURBINE BY METAL INJECTION MOULDING

(71) Applicant: Rolls-Royce Deutschland Ltd & Co KG, Blankenfelde-Mahlow (DE)

(72) Inventor: Roland Heinrich, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 932 days.

(21) Appl. No.: 15/166,534

(22) Filed: May 27, 2016

(65) Prior Publication Data

US 2016/0363005 A1 Dec. 15, 2016

(30) Foreign Application Priority Data

Jun. 12, 2015 (DE) .......................... 10 2015 210 770

(51) Int. Cl.
*F01D 25/28* (2006.01)
*B22F 3/10* (2006.01)
(Continued)

(52) U.S. Cl.
CPC ................ *F01D 25/28* (2013.01); *B22F 3/10* (2013.01); *B22F 3/225* (2013.01); *B22F 5/009* (2013.01);
(Continued)

(58) Field of Classification Search
CPC .. B22F 3/10; B22F 3/225; B22F 5/009; B22F 5/04; F01D 25/28; F01D 5/14; F01D 5/147; F05D 2230/21; F05D 2230/22
See application file for complete search history.

(56) References Cited

U.S. PATENT DOCUMENTS 4,886,639 A * 12/1989 Andrees .................... B22F 3/10
419/28
5,737,683 A 4/1998 Sterzel
(Continued)

FOREIGN PATENT DOCUMENTS

CN 102554234 A 7/2012
DE 19935276 A1 2/2000
(Continued)

OTHER PUBLICATIONS

European Office Action dated Feb. 12, 2018 for counterpart European Application No. 16171464.7.
(Continued)

*Primary Examiner* — David E Sosnowski
*Assistant Examiner* — Sang K Kim
(74) *Attorney, Agent, or Firm* — Shuttleworth & Ingersoll, PLC; Timothy J. Klima

(57) ABSTRACT

A structural component construction that is suitable and provided for the purpose of being further processed into a structural component of a gas turbine is provided. It is provided that the structural component construction has been manufactured by means of metal injection molding and subsequent sintering, and that it includes a support structure as an integral part of the structural component construction which is suitable for supporting the structural component during sintering, wherein the support structure is either not contained or not contained in its entirety in the finished structural component.

12 Claims, 8 Drawing Sheets

(51) Int. Cl.
*F01D 5/14* (2006.01)
*B22F 5/04* (2006.01)
*B22F 5/00* (2006.01)
*B22F 3/22* (2006.01)
*F01D 9/04* (2006.01)
*F01D 9/02* (2006.01)
*B23P 15/04* (2006.01)
*B23P 15/02* (2006.01)

(52) U.S. Cl.
CPC ............... *B22F 5/04* (2013.01); *F01D 5/14* (2013.01); *F01D 5/147* (2013.01); *F01D 9/02* (2013.01); *F01D 9/04* (2013.01); *F01D 9/042* (2013.01); *B22F 2003/1042* (2013.01); *B22F 2998/10* (2013.01); *B23P 15/02* (2013.01); *B23P 15/04* (2013.01); *F05D 2230/21* (2013.01); *F05D 2230/22* (2013.01)

(56) References Cited

U.S. PATENT DOCUMENTS

| | | | |
|---|---|---|---|
| 7,270,166 B2 * | 9/2007 | Jakus | B22C 7/02 164/122.1 |
| 2007/0102572 A1 | 5/2007 | Bohdal | |
| 2009/0304497 A1 | 12/2009 | Meier et al. | |
| 2015/0093249 A1 | 4/2015 | Lang et al. | |
| 2016/0221081 A1 * | 8/2016 | Yoshizawa | F01D 9/044 |
| 2016/0303654 A1 * | 10/2016 | Derguti | B22F 3/003 |

FOREIGN PATENT DOCUMENTS

| | | |
|---|---|---|
| DE | 10331397 A1 | 1/2005 |
| DE | 10331599 A1 | 2/2005 |
| DE | 10343780 A1 | 4/2005 |
| DE | 102012206087 A1 | 10/2013 |
| EP | 0633440 A1 | 1/1995 |
| EP | 0701875 A1 | 3/1996 |
| EP | 1156189 A1 | 11/2001 |
| FR | 2944721 A1 | 10/2010 |

OTHER PUBLICATIONS

European Office Action dated Jan. 17, 2019 for counterpart European Application No. 16171464.7.
European Search Report dated Oct. 10, 2016 for counterpart European Application No. 16171464.7.
German Search Report dated Jun. 12, 2015 for counterpart German application No. 10 2015 210 770.1.

* cited by examiner

COMPONENT CONSTRUCTION, COMPONENT FOR A GAS TURBINE AND METHOD FOR MANUFACTURING A COMPONENT OF GAS TURBINE BY METAL INJECTION MOULDING

REFERENCE TO RELATED APPLICATION

This application claims priority to German Patent Application No. 10 2015 210 770.1 filed on Jun. 12, 2015, the entirety of which is incorporated by reference herein.

BACKGROUND

The invention relates to a structural component construction, a structural component for a gas turbine and a method for manufacturing a structural component of a gas turbine by means of metal injection molding.

It is known from DE 10 2012 206 087 A1 to manufacture a structural component of an aircraft engine by means of metal injection molding. Here, at first a green body component of the structural component that is to be manufactured is made of a metal powder composition which is suitable for injection molding and contains metal powder mixed with a binder. Subsequently, the green body is debound, thus resulting in the creation of a brown body of the structural component. The brown body is sintered, wherein a shrinkage of the brown body occurs because the particles of the metal powder composition are compacted during the sintering process.

The manufacture of a structural component of an aircraft engine by means of metal injection molding can be performed in a comparatively cost-effective manner, which is why the further development of methods based on metal injection molding is of interest. However, when it comes to aviation, the use of powder-metallurgical injection molding methods has not yet become established on a larger scale. One problem that arises during the manufacture of a structural component of an aircraft engine by means of a metal powder injection molding process is that there are states occurring in the course of the sintering process in which the shape of the structural component becomes so soft and unstable that the structural component may be warped, for example due to its own weight or as a result of a gas flow and other influences, thus changing its shape in a way that may diverge from the design specifications. Consequently, there is a need for the further improvement of powder-metallurgical injection molding with respect to its suitability for the manufacturing technology in the field of aviation.

SUMMARY

The present invention is based on the objective to provide a structural component construction, a structural component of a gas turbine as well as a method for manufacturing such a structural component, which are based on metal injection molding and largely prevent any geometric change to the structural component's shape during the sintering process.

According to the invention, this objective is reached by means of a structural component construction as described herein, a structural component for a gas turbine as described herein, and a method for manufacturing a structural component of a gas turbine as described herein.

According to that, the invention according to a first invention aspect is characterized by a structural component construction which is suitable and provided for the purpose of being further processed into a structural component of a gas turbine. Consequently, the structural component construction represents an intermediate product that may be further processed into a finished structural component of a gas turbine. It is provided that the structural component construction is manufactured by means of metal injection molding and subsequent sintering, and comprises a support structure as an integral part of the structural component construction that is suitable for the purpose of supporting the structural component (i.e. those elements of the structural component construction that concern the subsequent finished structural component) during sintering and of protecting it against any deformation. As for the finished structural component, it either does no longer contain the support structure or does no longer contain it in its entirety.

The support structure suitable for injection molding as it is provided according to the invention ensures the necessary stability of the structural component construction throughout the entire sintering processes. In particular, the support structure makes it possible to offset or compensate for the relative movements that occur during sintering as well as for the accompanying shrinkage of the structural component. In this way, any warpage or deformation of the structural component construction parts forming the structural component to be manufactured can be avoided.

Thus, the solution according to the invention makes it possible to obtain a generic constructional solution to the problem of deformation during the sintering process. The stability of the structural component construction that is provided thanks to the solution according to the invention facilitates a robust as well as high manufacturing repetition accuracy and thus results in reduced costs.

According to one embodiment of the invention, it is provided that the support structure of the structural component construction has a planar locating surface which makes it possible to place the structural component construction onto a planar underground during sintering, with the planar locating surface facing downwards. Here, the support structure can have ribs or other reinforcing elements, with their front sides forming the planar locating surface. Through this measures, a stabile locating surface is provided that can offset or compensate for relative movements during sintering as well as for any shrinking of the structural component.

For example, the ribs that form the support structure can form a grid in order to provide a high degree of stability, while requiring the use of only a small amount of material. The width of the ribs may lie between 1 mm and 2 mm, for example. Further, it can be provided that the width of the ribs tapers off towards the locating surface, i.e. that they converge in a conical manner towards the locating surface. In this manner, removability from the injection molding form is enhanced, thus leading to further material reduction.

According to one embodiment of the invention, the structural component construction comprises a fan blade or a guide or rotor blade of a compressor, or a turbine of a gas turbine. The gas turbine can be a turbofan engine, for example. Here, it is further provided that the blade has a blade vane and a blade root, and that the support structure is connected to a blade root and/or forms a part of the blade root. It forms a part of the blade root particularly in the case that the support structure is only partially removed in the further manufacture steps for manufacturing the structural component.

According to one embodiment variant, it can be provided that the blade root has a recess in the area of the front edge or rear edge, which is provided for the purpose of facilitating bleed air extraction. Here, the recess is not a part of the support structure but rather of the actual blade root.

In a second aspect of the invention, the invention relates to a structural component for a gas turbine which has a structural component construction as described herein, wherein the support structure which is an integral part of the structural component construction has been partially or completely removed again, whereby the manufacture of the structural component is finalized. Accordingly, what is contemplated in this aspect of the invention is the structural component that results from the structural component construction as described herein, wherein the support structure has been partially or completely removed.

In one embodiment of this aspect of the invention, the structural component is based on a structural component construction that comprises the blade of a fan or a rotor or a stator of a gas turbine, wherein the blade has a blade vane and a blade root, and wherein the support structure is connected to the blade root and/or forms a part of the blade root. The structural component that results from such a structural component construction is characterized by the support structure having been partially removed in such a manner that an area of the support structure forms a stop or a reception area for a stop element in the installed state of the structural component. Such a stop element, which acts together with the end stop or the reception area, is fixedly connected to a housing of the gas turbine, and by working together with the end stop or the reception area serves the purpose of preventing movement of the structural component in the circumferential direction of the gas turbine. For example, it is necessary to prevent any circumferential movement of a stator's individual blades which are arranged adjacent to each other in the circumferential direction, thus forming a circular arrangement. According to the invention, the end stop or the reception area is provided by an area of the support structure that is formed as a single piece and as an integral part of the structural component.

Here, it is provided according to one embodiment of the invention that the reception area for the stop element is formed by two ribs of the support structure that are arranged in parallel. The stop element that is connected to the housing of the gas turbine meshes with the corresponding reception area in a form-fit manner.

According to an alternative embodiment, it is provided that the support structure of the structural component construction is completely removed. As a result of this, a structural component, such as a blade, with desired dimensions is created. Further, it can be provided in an embodiment variant that, in addition to removing the support structure, also defined structures are introduced into the blade root. For example, an additional bore or a section of a bore can be additionally introduced into the blade root, wherein the bore facilitates passing of a measuring device, for example of an optical measuring device. This makes it possible to collect data from the flow channel, for example during the operation of the gas turbine inside of which the structural component is installed.

In a third aspect of the invention, the invention relates to a method for manufacturing a structural component of a gas turbine by means of metal injection molding. Here, a green body of a structural component construction is manufactured by means of metal injection molding from a metal powder composition suitable for injection molding and containing metal powder intermixed with a binder. The green body is debound to turn into a brown body, and is then sintered. According to the invention, the method is characterized in that the green body is provided with a support structure as an integral part of the structural component construction during metal injection molding, with the support structure supporting the structural component construction during sintering, wherein the support structure is partially or completely removed after sintering the structural component construction for the purpose of manufacturing the structural component.

At that, according to an advantageous embodiment, the structural component is supported by the support structure during the sintering procedure in such a manner that the shrinking process of the structural component may take place without any warpage occurring during sintering in any spatial direction.

According to one embodiment, the shape of the blade root of a blade, which is particularly prone to being deformed during sintering on account of its own weight as well as of the weight of the blade vane that is supported by the blade root during sintering, is secured during sintering by the support structure.

BRIEF DESCRIPTION OF THE DRAWINGS

In the following, the invention is explained in more detail based on several exemplary embodiments by referring to the figures of the drawing.

DETAILED DESCRIPTION

Figure 1A:
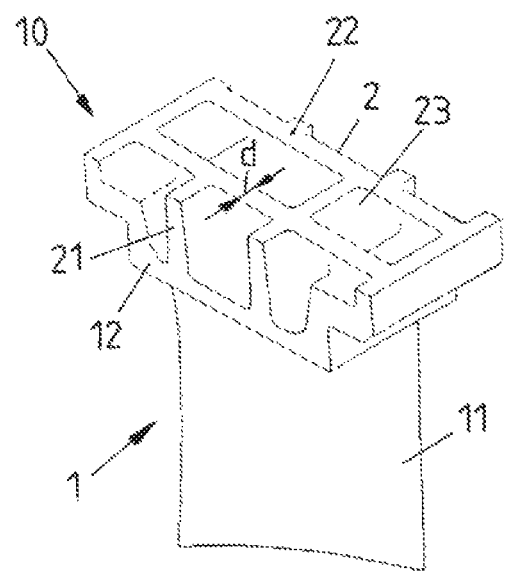
FIG. 1A shows a perspective rendering of a first exemplary embodiment of a structural component construction that concerns a blade of a gas turbine and comprises a support structure which is formed as an integral part of the blade root.
Figure 1B:
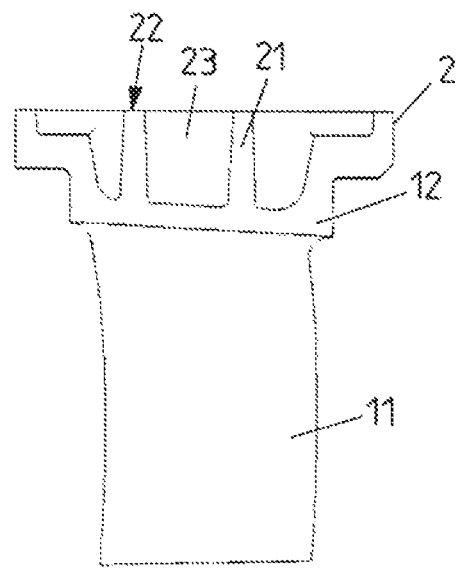
FIG. 1B shows the structural component construction of FIG. 1A in a side view.

FIGS. 1A, 1B show a first exemplary embodiment of a structural component construction 10 that concerns a guide blade and has a support structure which is integrated into the blade root.

The structural component construction shown in FIGS. 1A, 1B is manufactured based on powder-metallurgical injection molding (also referred to as MIM in short). Here, a green body of the structural component construction is manufactured from a metal powder composition suitable for injection molding and containing a metal powder intermixed with a binder, which is performed by means of metal injection molding in an injection molding machine. Afterwards, the structural component construction is debound, thus yielding a brown body of the structural component construction. Subsequently, the brown body is sintered.

The danger generally present in such a process is that the structural component construction is deformed in an undesired manner in the course of sintering, as it becomes soft and unstable during sintering. This may result in deformations, for example on account of the structural component construction's own weight or because of a gas flow that is present, and due to other influences. Such deformation is avoided in the structural component constructions of FIGS. 1A, 1B by virtue of the fact that in addition to the actual structural component 1, which in the shown exemplary embodiment concerns a blade and comprises a blade vane 11 and a blade root 12, the structural component construction 10 also has a support structure 2. The support structure 2 is a construction that is appropriate for injection molding, and that is suitable and provided for the purpose of supporting the actual structural component 1 during the sintering process, so that the structural component 1 is not deformed or warped during the sintering process. At that, the shrinking process of the actual structural component 1 can take place on the support structure during sintering, without any warpage occurring in any direction.

Since the manufacture process is carried out by means of metal injection molding, the support structure 2 is an integral part of the structural component construction 10 and is formed in one piece with the actual structural component 1. As will be explained in the following, the support structure 2 is removed again either partially or completely for the purpose of manufacturing the structural component 1, which is performed by means of cutting processes, for example. Thus, the structural component construction 10 shown in FIGS. 1A, 1B represents an intermediate product in the manufacture of the structural component 1.

Figure 2:
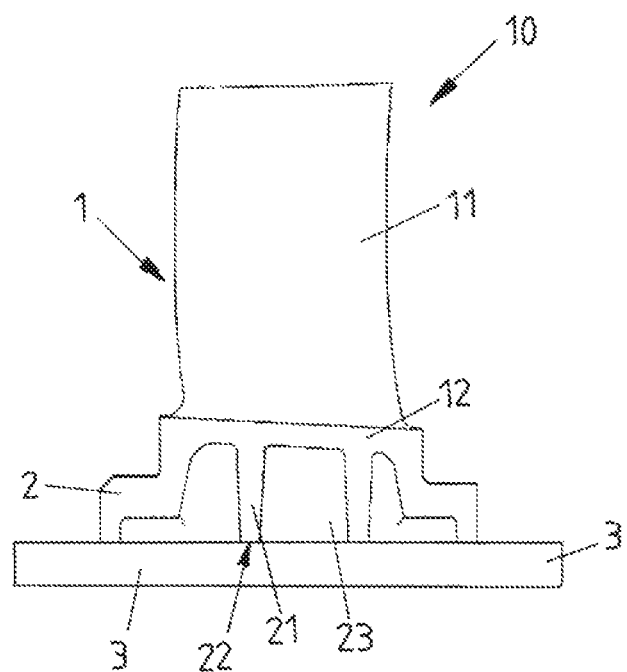
FIG. 2 shows the structural component construction of FIG. 1A in a position where it is placed so as to be resting on a planar underground for the purpose of sintering.

The support structure 2 comprises a plurality of ribs 21 that protrude substantially vertically from the blade root 12 and are formed as an integral part of the blade root 12, thus supporting the same. At their front sides, the ribs 21 form a planar locating surface 22, which makes it possible to place the structural component construction 10 onto a planar underground during sintering, with the planar locating surface 22 facing downwards. Such an arrangement of the structural component construction 10 during sintering is shown in FIG. 2. Here, the support structure 2 rests with its locating surface 22 on a planar resting area 3, which may be a kind of sintering ceramics, for example.

Referring again to FIGS. 1A, 1B, it should be noted that the ribs 21 of the support structure 2 can be arranged in a grid-like manner, wherein the areas between the ribs 21 are formed by recesses 23. The recesses 23 may get wider towards the locating surface 22 in order to ensure good removability of the green body of the structural component construction from an injection molding machine. Correspondingly, the width of the ribs 21 slightly decreases towards the locating surface 22, so that they taper off towards the locating surface 22.

In the area of the locating surface 22, the width d of the ribs 21 may for example lie between 1 and 2 mm, in particular between 1.3 and 1.7 mm, for example 1.5 mm. Here, the total length of the support structure 2 may for example be in the range between 20 and 40 mm, and the total width of the support structure 2 may be in the range between 10 and 20 mm.

It should be noted that instead of the ribs 21 also other reinforcing elements, as for example pillars or the like, may be used. If ribs 21 are used, they as is shown herein form walls that extend between the blade root 12 of the actual structural component 1 and the planar locating surface 22, thus forming the same.

FIG. 2 clearly illustrates the supporting function of the structural component construction according to the invention. The regarded structural component 1 comprises a structure (the blade root 12) which forms a concave opening towards the planar resting area 3.

Without the support structure 2 according to the invention, the danger of deformation would arise during the sintering process, when the component becomes soft and therefore unstable, which is due to the weight of the blade root 12 as well as of the blade vane 11 that is arranged above it and is also supported by the blade root 12 during the sintering process. Thanks to the support structure 2, and in particular the ribs 21 in connection with the stable locating surface 22, relative movements of the material during the sintering process and during the shrinking of the structural component are set off and compensated for, and the danger of deformation, in particular to the blade root 12, is averted.

It should be noted that the blade 11 can additionally be provided with a covering band (not shown).

Based on the structural component construction of FIG. 1A, various embodiments of the actual structural component 1—which in the regarded exemplary embodiment is a stator blade—can be derived by partially or completely removing the support structure 2, as will be explained below with reference to exemplary embodiments.

Figure 3A:
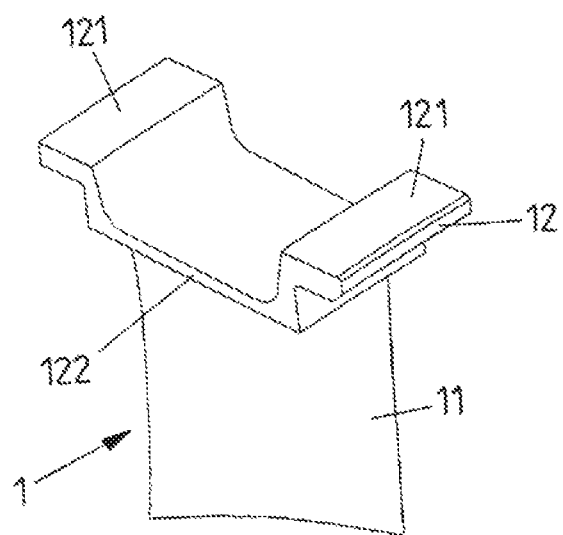
FIG. 3A shows a perspective rendering of a blade that results from the support structure having been completely removed from the structural component construction of FIG. 1A.
Figure 3B:
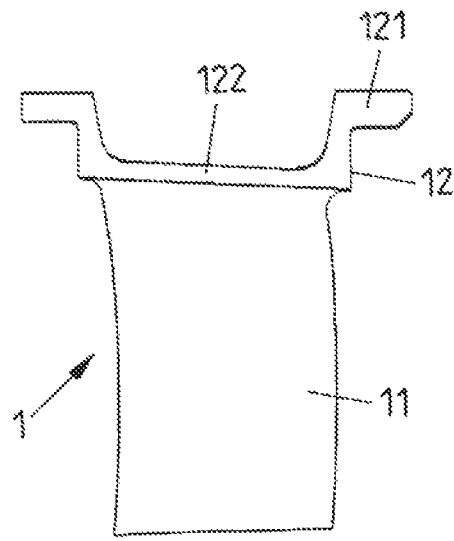
FIG. 3B shows a side view of the blade of FIG. 3A.

FIGS. 3A, 3B show a blade 1 that results from completely removing the support structure 2 from the structural component construction of FIG. 1A. Here, the blade 1 comprises a blade vane 11 and a blade root 12 that has two lateral mounting shoulders 121 as well as a platform 122 connected to the blade vane 11. The ribs 21 of the support structure 2 of the structural component construction of FIG. 1A have been completely removed, for example by means of milling or other cutting processes. As for the mounting shoulders 121, they can also be provided with the desired thickness by means of milling or other cutting processes.

The guide blade 1 can be shaped further by means of further processing, for example into a so-called "undersize-guide blade", which has a reduced platform width by virtue of parts of the platform 122 having been removed.

Figure 4:
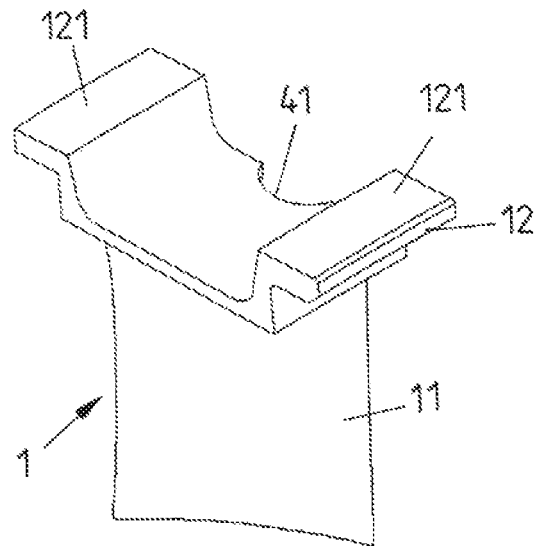
FIG. 4 shows a blade corresponding to FIG. 3A, wherein a partial bore is additionally inserted into the area of a side edge.
Figure 5:
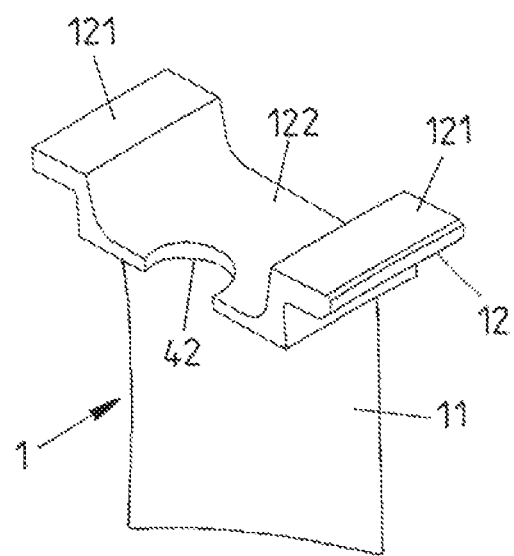
FIG. 5 shows a blade corresponding to FIG. 3A, wherein a partial bore is additionally inserted into the area of the other side edge.

FIGS. 4 and 5 show two further developments of a guide blade according to FIGS. 3A, 3B, in which a partial bore 41, 42 is respectively additionally inserted into the blade root 12, with the partial bores 41, 42 being respectively formed in the area of the longitudinal edges of the platform 122. If two guide blades are arranged next to each other according to FIGS. 4 and 5 in an arrangement of the guide blade inside a stator of a gas turbine as it is intended, a circular recess is created that can for example be used for passing a measuring device, such as for example an endoscope, for detecting conditions in the flow channel.

Figure 6A:
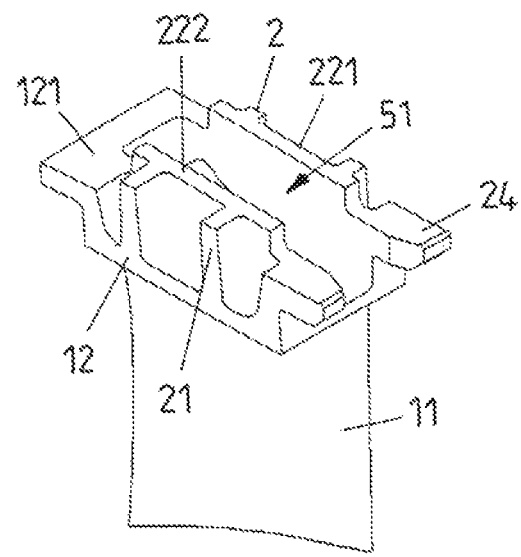
FIG. 6A shows a perspective rendering of a blade having a blade root that results from the support structure having been partially removed from the structural component construction of FIG. 1A, wherein the remaining support structure forms a reception area for a stop element.
Figure 6B:
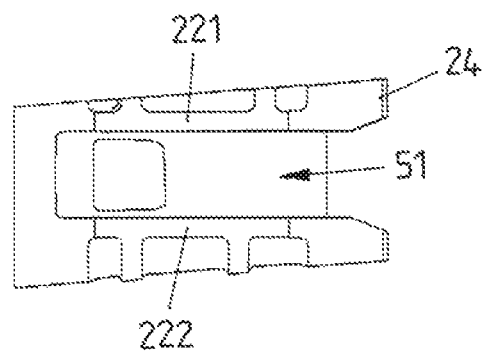
FIG. 6B shows the blade of FIG. 6A in top view.

FIGS. 6A, 6B show an exemplary embodiment of a structural component that results from the support structure 2 having been partially removed from the structural component construction 10 of FIG. 1A. Here, the support structure 2 has been removed in such a manner that the remaining structures form a reception area 51 that is suitable and provided for the purpose of receiving a stop element that is fixedly connected to a housing of a gas turbine, as will be explained in the following based on FIGS. 7A, 7B. The reception area 51 is formed by two walls or ribs 221, 222 of the support structure which have been retained. The walls are structurally supported by ribs 21 that are extending obliquely with respect to them. Also, a mounting shoulder 121 of the blade root 12 and the locating surfaces 24 have been created by the partial removal of the support structure.

It should be noted that the ribs 221, 222 are protruding in the longitudinal direction of the blade 1 up to beyond the plane that is defined by the surfaces 121, 24.

Figure 7A:
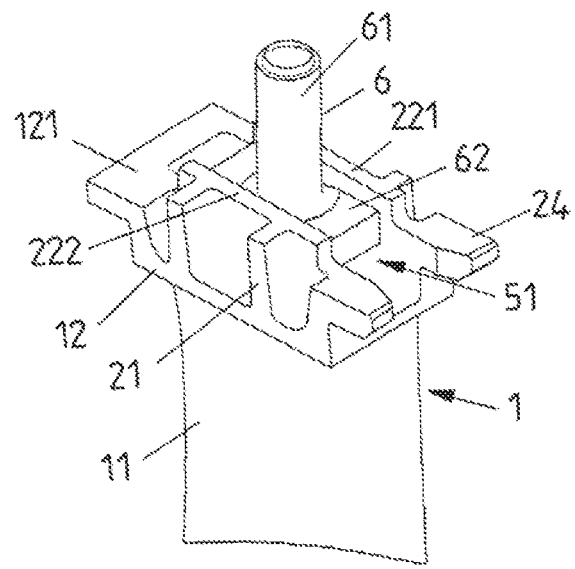
FIG. 7A shows a perspective rendering of the blade of FIG. 6A, with a stop element being inserted into the reception area.
Figure 7B:
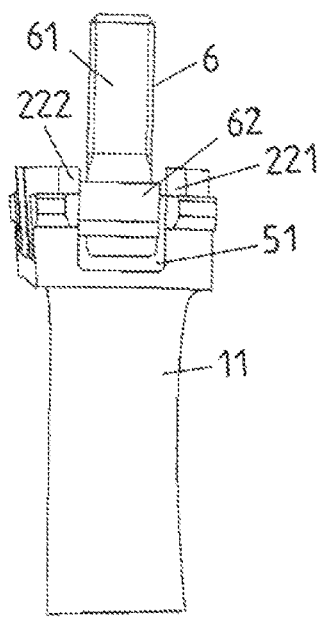
FIG. 7B shows the blade of FIG. 7A in top view.

FIGS. 7A, 7B show the structural component of FIG. 6A, with the stop element 6 being inserted into the reception area 51. The stop element 6 comprises a cylindrical part 61 and a platform 62, with the dimensions of the latter corresponding to the dimensions of the reception area 51. The stop element 6 is connected to a housing of a gas turbine and protrudes into the recess 51 after the blade 1 has been installed inside a stator of a gas turbine in the intended manner. Here, the platform 62 of the stop element 6 is retained inside the recess 51 by means of a positive-locking fit.

In this way, the blade geometry that is to say, the remaining support structure with the reception area 51 as it acts together with the stop element 6 prevents any movement of the mounted blade 1 in the circumferential direction of the housing. Because the reception area 51 is formed as an integral part in the blade root construction of blade 1, this function can be realized without having to provide additional, separately manufactured components.

Figure 8A:
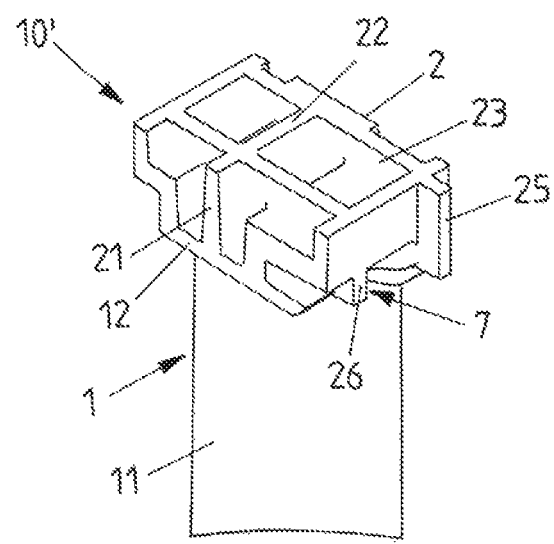
FIG. 8A shows a perspective rendering of a second exemplary embodiment of a structural component construction that concerns a blade of a gas turbine and has a support structure which is formed as an integral part of the blade root.
Figure 8B:
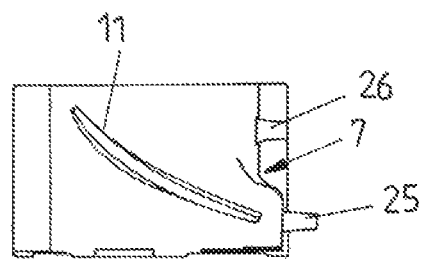
FIG. 8B shows the structural component construction of FIG. 8A in top view after the structural component construction of FIG. 8A has been turned by 180°.

FIGS. 8A, 8B show a second exemplary embodiment of a structural component construction that concerns a stator blade of a gas turbine, wherein a separate support structure 2 is provided that is formed integrally with the blade root 12. The basic structure of the structural component construction 10' corresponds to that of the structural component construction 10 of FIG. 1A. The support structure 10' comprises a plurality of ribs 21 that are arranged in a grid-like manner, forming a planar locating surface 22 and defining recesses 23 between each other. The blade 1 comprises a blade vane 11 and a blade root 12. As is shown in an exemplary manner in the structural component construction of FIGS. 8A, 8B, variations in the number, size and arrangement of the ribs 21 or of other reinforcing elements can be provided.

In the structural component construction of FIGS. 8A, 8B, a recess 7 is additionally provided in the area of the front edge or the rear edge of the blade root 12, for example for the purpose of bleed air extraction in the installed state of the structural component.

Figure 9A:
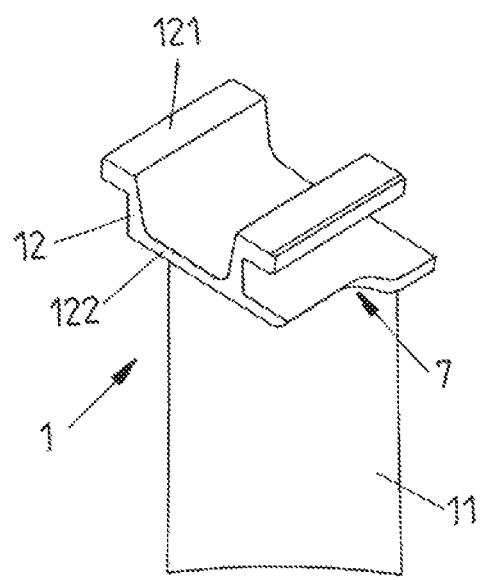
FIG. 9A shows a perspective rendering of a blade having a blade root that results from the support structure having been completely removed from the structural component construction of FIG. 8A, with the additional rendering of a recess for the extraction of bleed air.
Figure 9B:
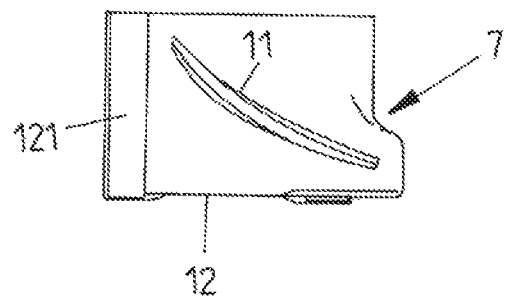
FIG. 9B shows the blade of FIG. 9A in top view after the blade of FIG. 9A has been turned by 180°.

FIGS. 9A, 9B show a guide blade 1 after the support structure 2 of FIG. 8A has been completely removed, wherein similar to FIGS. 3A, 3B a blade root 12 is created, having a platform 122 as well as two mounting shoulders 121 located on a different plane than the platform 122. What can further be seen is the recess 7 for the extraction of bleed air which is formed at the front edge or the rear edge after the support structure has been removed.

Figure 10A:
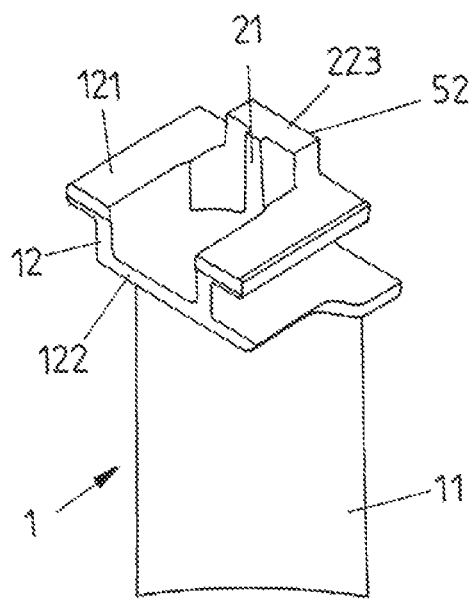
FIG. 10A shows a perspective rendering of a blade having a blade root that results from the support structure having been partially removed from the structural component construction of FIG. 8A, wherein the remaining support structure forms an end stop for a stop element.
Figure 10B:
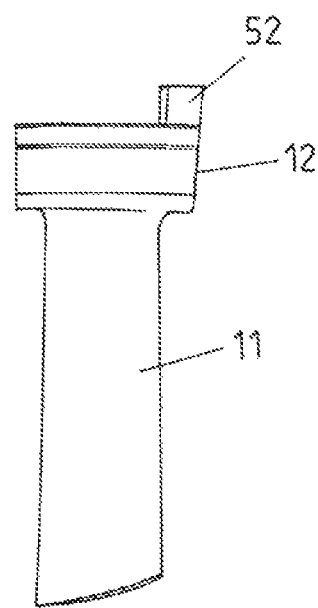
FIG. 10B shows the blade of FIG. 10A in a side view.

FIGS. 10A, 10B show another derivation from the structural component construction of FIGS. 8A, 8B. In this derivation, the support structure of FIGS. 8A, 8B has been removed except for a wall area 223. This wall area 223 provides an end stop 52 for a stop element that is fixedly connected to a housing of a gas turbine, in a manner corresponding to the stop element 6 of FIGS. 7A, 7B. Except for this end stop 52, the blade root construction corresponds to the blade root of FIGS. 9A, 9B with a platform 122 and two mounting shoulders 121. The end stop 52 that is formed by the wall area 221 can be structurally reinforced by means of a transversal rib 21. The end stop 52 protrudes beyond the plane formed by the two mounting shoulders 121.

The present invention has been described in the Figures with reference to a structural component that is a stator blade of a compressor or of a turbine of a gas turbine, in particular of a turbofan engine. However, the principles of the present invention apply in the same manner to blades of a fan or blades of a rotor of a gas turbine. Moreover, the principles of the present invention also apply to any structural component which is manufactured by means of metal injection molding and in which the problem of deformation occurs during the sintering process. For example, the present invention is suitable for such structural components that, during the sintering process, have a concave recess with respect to the resting area on which the structural component rests during the sintering procedure, so that the danger of deflection is present during the sintering process.

It should be noted that the features of the individually described exemplary embodiments of the invention can be combined with each other in various combinations. As far as ranges are defined, they include all values within these ranges as well as all partial areas that fall within a range.

The invention claimed is:

1. A method for manufacturing a structural component of a gas turbine by metal injection molding, comprising:
   metal injection molding a green body of a structural component construction from a metal powder composition suitable for injection molding,
   debindering the green body to form a brown body of the structural component construction,
   subsequently sintering the structural component construction,
   providing the green body with a support structure during the metal injection molding as an integral part of the structural component construction that supports the structural component construction during sintering, and
   following the sintering of the structural component construction, partially removing the support structure by a cutting process such that, in an installed state of the structural component, an area of the support structure forms a stop or a reception area for a stop element that is connected to a housing of the gas turbine, and acting together with the stop or the reception area, serves to prevent movement of the structural component in a circumferential direction of the gas turbine.

2. The method according to claim 1, and further comprising providing that the support structure has a planar locating surface, and that the structural component construction rests on a planar resting area during sintering, with the planar locating surface facing downwards toward the planar resting area.

3. The method according to claim 1, and further comprising supporting the structural component during the sintering with the support structure such that a shrinking process of the structural component can take place in all spatial directions during sintering with reduced warpage.

4. The method according to claim 2, and further comprising providing that the support structure has ribs or pillars, and the front sides of the ribs or pillars form the planar locating surface.

5. The method according to claim 4, wherein the support structure has ribs and further comprising providing that the ribs form a grid.

6. The method according to claim 4, and further comprising providing that widths of the ribs taper off towards the planar locating surface.

7. The method according to claim 1, and further comprising providing that the structural component is a blade of a fan or of a rotor or a stator of a gas turbine with a blade vane and a blade root, and the support structure is connected to the blade root.

8. The method according to claim 7, and further comprising providing the blade root with a recess in an area of a front edge or a rear edge for providing air extraction.

9. The method according to claim 1, and further comprising:

providing that the structural component is a blade of a fan or of a rotor or a stator of a gas turbine with the blade including a blade vane and a blade root, and the support structure is at least one chosen from connected to the blade root and forming a part of the blade root, completely removing the support structure to form the blade root.

10. The method according to claim 1, and further comprising:

providing that the structural component is a blade of a fan or of a rotor or a stator of a gas turbine with the blade including a blade vane and a blade root, and the support structure is at least one chosen from connected to the blade root and forming a part of the blade root, completely removing the support structure to form the blade root, and providing that the blade root include a bore for receiving a measuring device.

11. The method according to claim 1, and further comprising completely removing the support structure.

12. The method according to claim 1, and further comprising providing that the structural component is a blade of a fan or of a rotor or a stator of a gas turbine with a blade vane and a blade root, and the support structure forms a part of the blade root.

* * * * *